June 5, 1934.  E. R. WITZEL  1,961,185
VOLTAGE REGULATOR FOR ALTERNATORS
Filed Aug. 25, 1932
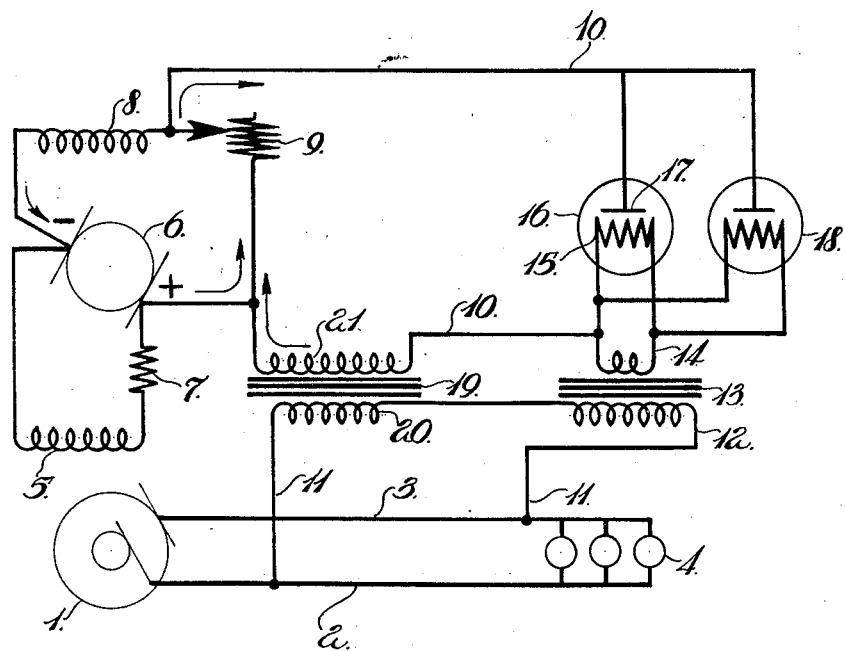
INVENTOR
Earl R. Witzel
BY Lyman C. Conger
ATTORNEY Patented June 5, 1934

1,961,185

UNITED STATES PATENT OFFICE 1,961,185

VOLTAGE REGULATOR FOR ALTERNATORS

Earl R. Witzel, Kohler, Wis.

Application August 25, 1932, Serial No. 630,409

4 Claims. (Cl. 171—119)

My invention relates to improvements in voltage regulators for alternators, and the object of my invention is to provide means for maintaining the output of an alternating current generator at a practically constant pre-determined voltage.

One use of my invention is in connection with alternators driven by internal combustion engines. In such installations variations in the load or of the speed of the engine cause wide fluctuations in the voltage, necessitating the use of some means of regulating the voltage to compensate for variations of speed and load. Although this is a typical use, it will be understood that I do not confine myself to its use in this connection only, as my invention is capable of voltage regulation of any direct current excited alternator.

Heretofore it has been common practice to regualte the voltage of alternators by varying the current in the field circuit of the exciter, which has been accomplished by adjusting the value of an external resistance in the field circuit either manually or by automatic means, such as a solenoid operated carbon pile resistance.

Varying the current in the field of the exciter naturally varies the strength of the field and the current output of the exciter, with consequent variation in the strength of the field of the alternator, and results in a corresponding variation of the voltage thereof.

My invention contemplates the use of a fixed external resistance in the field circuit of the exciter and varying the current in the exciter field circuit by increasing or decreasing the amount of a cumulative direct current passed through the resistance from a circuit parallel to the exciter field circuit. Where parallel circuits are arranged to pass cumulative currents through a common fixed resistance, increasing the current in one circuit will decrease the current in the parallel circuit and vice versa.

Passing a greater current through the resistance increases the voltage drop across it and thus, although the ohmic value of the resistance is not changed, the resistance is, in effect, increased with a consequent decrease in current flowing through it from the parallel circuit.

If a circuit parallel to the field circuit of the exciter is adapted to pass a cumulative current through a common resistance and the current in this parallel circuit varies directly with the voltage of the alternator, it will vary the amount of current which may pass through the field of the exciter in inverse ratio with variations in the voltage of the alternator.

I attain the above objects by the use of the mechanism and circuits illustrated in the accompanying drawing, which is a diagrammatic view of the mechanism and circuits comprising my invention.

In the drawing the numeral 1 refers to an alternator which may be of any of the well known types, single or poly-phase. The numerals 2 and 3, in the case of a single phase generator, indicate the output connections from the alternator to the load 4. In the case of a poly-phase generator, the numerals 2 and 3 refer to connections from one phase of the alternator to the load, it being common practice to regulate the voltage of poly-phase generators by the regulation of the voltage of one phase only. The field 5 of the alternator 1 is energized by an exciter 6 which is a direct current generator, and is commonly, though not necessarily, mounted on the same shaft as the alternator. The field circuit of the alternator may also incorporate a fixed resistance 7, the function of which is described in detail hereafter. The exciter 6 has the usual shunt field circuit 8, incorporating a manually variable resistance 9.

The circuit thus far described is a conventional one, and in ordinary practice voltage regulation would be accomplished by varying the ohmic resistance of the resistance 9 either manually or by automatic means. My invention contemplates varying the current flowing through the exciter field circuit 8 without changing the ohmic resistance of the resistance 9 by means of varying the current in a parallel circuit 10, the resistance 9 being common to both circuits.

The numeral 11 indicates a shunt circuit from the connections 2 and 3, and contains in series the primary 12 of the iron core transformer 13. The secondary 14 of the transformer 13 furnishes current for heating the filament 15 of the rectifying tube 16, which is a two-element thermionic vacuum tube such as is commonly termed a tungsten argon rectifying tube. It will be obvious that any device which will rectify alternating current to direct current is the equivalent of the tube 16. The plate 17 of the tube 16 is connected to the circuit 10. It will be noted that the plate 17 is connected to the same terminal of the resistance 9 as the negative terminal or brush of the exciter 6 and that the filament 15 is connected to the same terminal of the resistance 9 as the positive terminal or brush of the exciter. Thus the current flows through the resistance 9 in the same direction from both the exciter field circuit 8 and the parallel circuit 10.

I have found it desirable to use a second rectifying tube 18 connected parallel to the tube 16 as a safeguard against the burning out or the becoming inoperative of the regulating tube. If desirable, any number of rectifying tubes might be used in parallel connection, but for ordinary uses two will provide an ample margin of safety.

The circuit 11 also contains, in series, the primary 20 of the iron core transformer 19, the secondary 21 of which is in series in the circuit 10 and connected to the filament 15. Thus, any increase in the voltage of the alternator will cause an increase in the current flowing through circuit 11 and the primary 20 of the transformer 19, causing an increase in the current induced in the secondary 21. The current induced in the secondary 21 flows through circuit 10 in the direction indicated by the arrows in the drawing, passing through the resistance 9, plate 17 of the tube 16 to the filament 15. Thus a direct current is passed through the resistance 9 in the same direction and cumulative to the current from the exciter field circuit. The current flowing through the circuit 10 varies directly as the voltage of the alternator.

Upon an increase in the voltage of the alternator an increased current is passed through resistance 9, the voltage drop across it is increased, thus, in effect, increasing its resistance to the flow of current through the exciter field circuit 8 and weakening the field of the exciter. The output of the exciter is thus reduced, the field of the alternator weakened, and its voltage decreased.

Upon a decrease in the voltage of the alternator 1 the flow of current through the circuit 11 is reduced with consequent reduction of the current induced in the secondary 21 and weakening of the current flowing through circuit 10. The voltage drop across resistance 9 is decreased, weakening its resistance to the flow of current through the exciter field circuit 8. This causes a greater current to flow through field circuit 8, the field of the exciter is strengthened and its output increased, with consequent strengthening of the field of the alternator and an increase in its voltage.

There is thus provided an effective means of regulating the voltage of the alternator. Once the resistance 9 is adjusted to give the normal voltage required, it needs no further adjustment, and remains fixed during the operation of the alternator. If desired, the resistance 9 may be a fixed resistance of the proper value to give the normal voltage desired.

The efficiency of the regulation is considerably increased by constructing the transformer 13 so as to act as a choke coil. The transformer 13 is preferably designed for high magnetic saturation at the normal voltage of the alternator. The transformer 19 is then designed for low magnetic saturation to absorb the remaining line voltage. This greatly increases the sensitivity of the regulator, as it causes a correspondingly greater percentage in variation of the output of the transformer 19 than would be the case if the transformer 13 were not employed as a choke coil.

For example, in the case of a generator having a normal voltage of 110 volts, the transformer 13 might be designed so that at normal voltage there is a voltage of 100 volts across the primary 12 and 10 volts across the primary 20 of the transformer 19. The core of the transformer 13 being at high magnetic saturation at the normal voltage of the alternator, if the current voltage increases to 115 volts there will not be a corresponding increase in voltage across the primary 12, but the voltage will increase to probably 102 volts, whereas the voltage across the primary 20 of the transformer 19 would increase to 13 volts, as the transformer 19 is of low magnetic saturation to absorb the remaining voltage. If the alternator voltage increases to 120 it would result in approximately 103 volts across the primary 12 and 17 volts across the primary 20 of the transformer 19.

Thus, an increase of approximately 9% in the voltage of the alternator will result in an increase of 70% in the voltage drop across the primary 20, and a small percentage increase of the voltage of the alternator will result in a much greater percentage increase in the current delivered into circuit 10 by the secondary 21 of the transformer 19, consequently the regulation is more sensitive and effective than it would be if the transformer 13 were not designed to act also as a choke coil.

Another beneficial result is that the filament 15 is not subjected to great fluctuations of current as would be the case were the transformer 13 completely responsive to variations in the voltage of the alternator. It will be understood that the above explanation is for purposes of illustration only, and does not take into account the vector relationship actually prevailing under operating conditions.

The resistance 7 is adjusted to conform to the operating characteristics of the exciter 6. I have found that too high an ohmic resistance of the resistance 7 causes the exciter to operate at too near its saturation point and makes it react to regulation sluggishly, while too low a resistance causes the regulation to be so critical as to be unstable. The resistance 7 must, therefore, be adjusted to the operating characteristics of the exciter 6. Once the proper value of the resistance 7 is found, empirically or otherwise, the resistance 7 remains fixed and needs no further adjustment. In some cases the resistance 7 may be dispensed with entirely, depending, as aforesaid, upon the characteristics of the exciter.

It will be understood by those skilled in the art that the method of regulation above described may be applied directly to the exciting circuit or field of the alternator rather than to the field of a separate exciter.

My regulator is amply sensitive and efficient for commercial use, and is considerably more economical of manufacture than regulators now in ordinary commercial use.

I claim:

1. A voltage regulator for an alternator comprising an exciter, a field circuit therefor, a circuit parallel thereto, a resistance common to both said circuits, a rectifying tube in series with said parallel circuit, a transformer having its secondary in series with the aforementioned parallel circuit and its primary in shunt relationship to the alternator, a second transformer having its secondary in the filament circuit of the aforesaid rectifying tube and its primary in series with the primary of the first transformer, said second mentioned transformer being designed for high magnetic saturation at the normal voltage of the alternator and said first mentioned transformer being designed for low magnetic saturation at the normal voltage of the alternator, the polarities of the said field circuit and said parallel circuit being such that the currents therefrom flowing through said common resistance are cumulative.

2. A voltage regulator for an alternator comprising an exciter, a field circuit therefor, a circuit parallel thereto, a resistance common to both said circuits, a transformer having its secondary in series with said parallel circuit and its primary in shunt relationship to said alternator, rectifying means in said parallel circuit, and a choke coil in series with the primary of said transformer, said choke coil being designed for high magnetic saturation at the normal voltage of the alternator, the polarities of said field circuit and said parallel circuit being such that currents therefrom flow through said common resistance in the same direction.

3. A voltage regulator for an alternator comprising a field circuit, means for supplying an exciting current thereto, a circuit parallel to said field circuit, a resistance common to both said circuits, a transformer having its secondary in series with said parallel circuit and its primary in shunt relationship to said alternator, rectifying means in said parallel circuit, and a choke coil in series with the primary of said transformer, said choke coil being designed for high magnetic saturation at the normal voltage of the alternator, the polarities of said field circuit and said parallel circuit being such that currents therefrom flow through said common resistance in the same direction.

4. Voltage control means comprising a generator field circuit, a resistance in series with said field circuit, a rectifying circuit parallel to said field circuit and incorporating said resistance as a common element, the polarities of said circuits being such that currents therefrom flow through said resistance in the same direction, a thermionic rectifying tube in said rectifying circuit, a heating circuit therefor, an alternating current circuit, a transformer having its primary in said alternating current circuit and its secondary in said rectifying circuit, and a second transformer designed for high magnetic saturation at the normal voltage of said alternating current circuit and having its primary in said alternating current circuit and its secondary in said tube heating circuit.

EARL R. WITZEL.